(12) United States Patent
Freedman (10) Patent No.: US 11,987,391 B2
(45) Date of Patent: May 21, 2024

(54) SYSTEMS AND METHODS FOR HORIZONTAL SEA LEVEL LAUNCHING OF SPACE VEHICLES USING MAGNETIC LEVITATION, LINEAR ACCELERATION THERMAL ENERGY SCAVENGING, AND A STEAM ROCKET ENGINE

(71) Applicant: Jared Allan Freedman, Hollywood, FL (US)

(72) Inventor: Jared Allan Freedman, Hollywood, FL (US)

( * ) Notice: Subject to any disclaimer, the term of this patent is extended or adjusted under 35 U.S.C. 154(b) by 0 days.

(21) Appl. No.: 17/566,856

(22) Filed: Dec. 31, 2021

(65) Prior Publication Data
US 2022/0227502 A1    Jul. 21, 2022

Related U.S. Application Data

(60) Provisional application No. 63/134,625, filed on Jan. 7, 2021.

(51) Int. Cl.
| | |
|---|---|
| *B64G 1/00* | (2006.01) |
| *B64G 1/40* | (2006.01) |
| *B64G 5/00* | (2006.01) |

(52) U.S. Cl.
CPC ............. *B64G 1/002* (2013.01); *B64G 1/401* (2013.01); *B64G 5/00* (2013.01)

(58) Field of Classification Search
CPC .......... B64G 1/002; B64G 5/00; B64G 1/401; B64G 1/58
See application file for complete search history.

(56) References Cited

U.S. PATENT DOCUMENTS

| | | | | |
|---|---|---|---|---|
| 4,724,738 | A  * | 2/1988 | Johnson ................... | F41F 3/07 244/171.6 |
| 8,858,161 | B1 * | 10/2014 | Ryznic ...................... | F02C 7/16 415/115 |
| 2015/0136913 | A1 * | 5/2015 | Dillon ...................... | B64G 5/00 244/171.1 |
| 2015/0315971 | A1 * | 11/2015 | Reitz ......................... | B64C 1/38 60/39.461 |
| 2018/0328234 | A1 * | 11/2018 | Wolfe ...................... | B63H 21/20 |
| 2020/0198809 | A1 * | 6/2020 | Holder ...................... | B64F 1/10 |
| 2021/0147087 | A1 * | 5/2021 | Gerstler ................... | B64C 1/38 |

* cited by examiner

*Primary Examiner* — Brady W Frazier
*Assistant Examiner* — Shanna Danielle Glover
(74) *Attorney, Agent, or Firm* — Koenig IP Works, PLLC; Katherine Koenig (57) ABSTRACT

In broad embodiment, the present invention is a collection of systems, methods, and devices that describe a magnetic levitation linear accelerator driven hypersonic sled, magnetically coupled to a reusable Space Plane Launch Vehicle, which are accelerated to hypersonic speeds at sea-level altitude, thereby generating a hypersonic thermal shockwave of substantial energy which is then scavenged by methods and devices within the Space Plane Launch Vehicle, allowing it convert a distilled liquid water steam fuel payload, on a controlled basis, into supercritical steam exhaust and then use this supercritical steam exhaust for thrust continuing acceleration, using only electricity and distilled water as consumables and leaving only water vapor as a direct exhaust.

7 Claims, 8 Drawing Sheets

SYSTEMS AND METHODS FOR HORIZONTAL SEA LEVEL LAUNCHING OF SPACE VEHICLES USING MAGNETIC LEVITATION, LINEAR ACCELERATION THERMAL ENERGY SCAVENGING, AND A STEAM ROCKET ENGINE

CROSS-REFERENCES TO RELATED APPLICATIONS

This application is a continuation of and claims priority to U.S. Provisional Patent Application Ser. No. 63/134,625, filed Jan. 7, 2021, entitled SYSTEMS, METHODS, AND DEVICES FOR LAUNCHING SPACE VEHICLES USING MAGNETIC LEVITATION, LINEAR ACCELERATION, THERMAL ENERGY SCAVENGING, AND WATER STEAM ROCKETS, the entirety of which is incorporated herein by reference.

STATEMENT REGARDING FEDERALLY SPONSORED RESEARCH OR DEVELOPMENT

Not Applicable.

REFERENCE TO SEQUENCE LISTING, A TABLE, OR A COMPUTER PROGRAM LISTING MEDIA APPENDIX

Not Applicable.

BACKGROUND OF THE INVENTION

1. Field of the Invention

The present invention relates to several fields within Spacecraft patents (Class 244/158.1). The present invention is primarily a method for Orbital Insertion (Class 244/158.5) and utilizes techniques from the following additional fields: Launch From Surface to Orbit (Class 244/171.3), Horizontal Launch (Class 244/171.4), Having Aerodynamic Lifting Body (Class 244/159.3), With Payload Accommodation (Class 244/173.1), having Active Thermal Control (Class 244/171.8), and Steam Rockets as part of Launching (Class 244/63).

2. Description of the Related Art

Throughout the history of Aerospace Engineering, the only viable way to send a vehicle from the surface of the Earth into space has been via rocketry. Using the vast majority of initial liftoff mass for reaction fuel, only a very small percentage of total mass launched achieves orbit. Historically 90% or more of the mass initially launched is burned in the Earth's atmosphere as reaction fuel, producing thrust via exhaust. Even if traditional rocketry is made vastly cheaper, the environmental impact of multiple daily launches has not been properly analyzed, and it is certain to have an adverse environmental impact as not only hydrogen and oxygen burn when the fuel combusts, but also a host of other elements that when added cumulatively, could make for significant impacts. Excessive costs for limited payload capacity and environmental concerns stifles Space exploration efforts and more economical and environmentally friendly options are required.

Magnetic Levitation and Linear Accelerators have been explored as an alternative method of space launch in science fiction literature and in a variety of patents both granted and abandoned over the years, but no practical research has been published due to the unsurmountable expense and dubious chance for success of the various methods proposed. These economically unviable solutions include building a launch system on the side of one of the Himalaya Mountains, or having rail systems that change their angle of incline while the launch projectile is moving at hypersonic speeds, neglecting to account for inertial forces against the rail bed, the rail sled, and the projectile. Additional improbable solutions include building the rail launch system inside of a miles long tube, with the last few miles built almost 1000 feet into the air on a straight incline of 57 degrees. Most neglect to even mention or address mitigation methods to the prevent excessive heat buildup from the thermal shockwave developed at supersonic and hypersonic speeds while travelling within significant atmospheric pressures close to one (1) atm. While the vast majority of proposed solutions don't deal with the heat generated from moving mass at hypersonic speeds through the atmosphere, a few solutions that do include using ice or frigid liquid to offset the launch heat, or reducing the atmosphere with high altitude construction in the remotest places on the planet, and even floating the rail launch system at extreme altitudes with dirigibles. None of the proposed solutions account for economic viability and/or feasibility and each that has been researched in depth has included significant flaws in practical applicability.

BRIEF SUMMARY OF THE PRESENT INVENTION

The present invention seeks to dramatically reduce the cost and environmental impact of launching materials into space, with added benefits of providing a reusable platform that can manage dozens of daily launches with only electricity and distilled liquid water as inputs and leaving only steam vapor from supercritical water as an exhaust. Specifically, the invention comprises devices, apparatus, and methodology for launching durable materials as cargo into Earth orbit at an industrial scale, operating 24/7 year-round by means of a specially designed reusable Space Plane Launch Vehicle that is accelerated to hypersonic speeds horizontally on a magnetic levitation linear accelerated sled at near sea-level atmospheric pressure. Utilizing specifically configured airfoils, the energy from the hypersonic thermal shockwave is directed close to leading edges of the nose and wing areas and the energy from this shockwave is scavenged by thermal shielding that both protects the craft internals from excessive heat, and transmits that heat energy through an thermal transport system that conducts heat from the shielding to an internal boiler chamber where a supercritical water produced from distilled liquid water payload is converted by the addition of heat from the thermal transport system into thousand-plus-degree supercritical ultra-high pressure steam which, converted to thrust by a nozzle control system, continues to accelerate the Space Plane Launch Vehicle long after acceleration from the Magnetic Levitation Linear Accelerator system has completed. To increase efficiency at the expense of thermal scavenging potential, encasing the entire rail in a concrete shell with air handling stations installed along the length at intervals, that removes the majority of the atmosphere from the first portion of the launch, will be advantageous. Burying the majority of the launch rail underground will accomplish the same goal, but at the expense of rail serviceability. Using adjustable flight surfaces and an actuated rocket nozzle, controlled by an integrated autonomous flight computer, the Space Plane Launch Vehicle will adjust the pitch angle to an appropriate escape vector depending on programed destination and structural capacity of craft and cargo for high-G maneuvers. Flight will continue until the thermal energy has been exhausted, or the liquid water and/or super-critical water is itself exhausted. Using a combination of liquid water payload, boiler chamber size, initial linear accelerated take-off velocity, and thermal transport system configuration, a wide variety of orbits can be attained. Once orbit is achieved, a traditional orbital maneuvering system using liquid or cryogenic gas propellant rocket engines will be used for orbital injection after main steam rocket engine cutoff, orbital corrections during flight, and final deorbit burn for reentry, where the Space Plane Launch Vehicle lands like a seaplane on the water and is refurbished for the next flight. Cargo weight can be sacrificed and landing gear installed enabling the Space Plane Launch Vehicle to land on an appropriately sized airstrip. As an example, a fleet of approximately one thousand Space Plane Launch Vehicles with a single Horizontal Magnetic Levitation Linear Induction Rail System would enable six launches per hour, twenty-four hours per day, seven days per week, assuming a Space Plane Launch Vehicle could be refurbished and made ready for flight within seven days from landing, and that time in orbit was kept to just a few hours to unload cargo.

In one embodiment of the present invention, the horizontal magnetic levitation linear induction rail system for accelerating (producing linear acceleration of) the space plane launch vehicle includes a horizontal magnetic levitation rail bed, a magnetically levitated drive sled, an optional magnetically coupled dual-purpose space plane launch vehicle cradle/extra liquid water storage tank, and an automated integrated computer controlled reusable cargo carrying space plane launch vehicle with specially designed airfoil, heat sink thermal shielding, heat-pump thermal energy transport system, a distilled liquid water steam storage and delivery system, supercritical water storage, and a super-heated steam boiler/rocket nozzle control system.

REFERENCE NUMERALS IN THE DRAWINGS

10 Space Plane Launch Vehicle
12 Magnetic Levitation Linear Induction Rail System
14 Launch Stage
16 Steam Rocket Engine (or Super-critical Steam Rocket Engine)
20 Leading Edge Thermal Shield Airfoil
22 Thermal Transport System
24 Boiler Chamber
26 Steam Exhaust Thrust Control System
28 Super-critical Water Storage
30 Water Flow Controller
40 Cargo Bay
42 Cargo Bay Doors
50 Magnetic Levitation Linear Induction Rail System
51 Magnetic Levitation Rail Bed
52 Magnetic Levitation Electromagnets
54 Sled Stabilizer Electromagnets
60 Space Plane Launch Vehicle Accelerator Sled
62 Space Plane Launch Vehicle Sled Cradle (optional)
64 Rail Enclosure
70 Supersonic Thermal Shockwave
72 Hypersonic Thermal Shockwave

DETAILED DESCRIPTION OF THE PRESENT INVENTION

Figure 1:
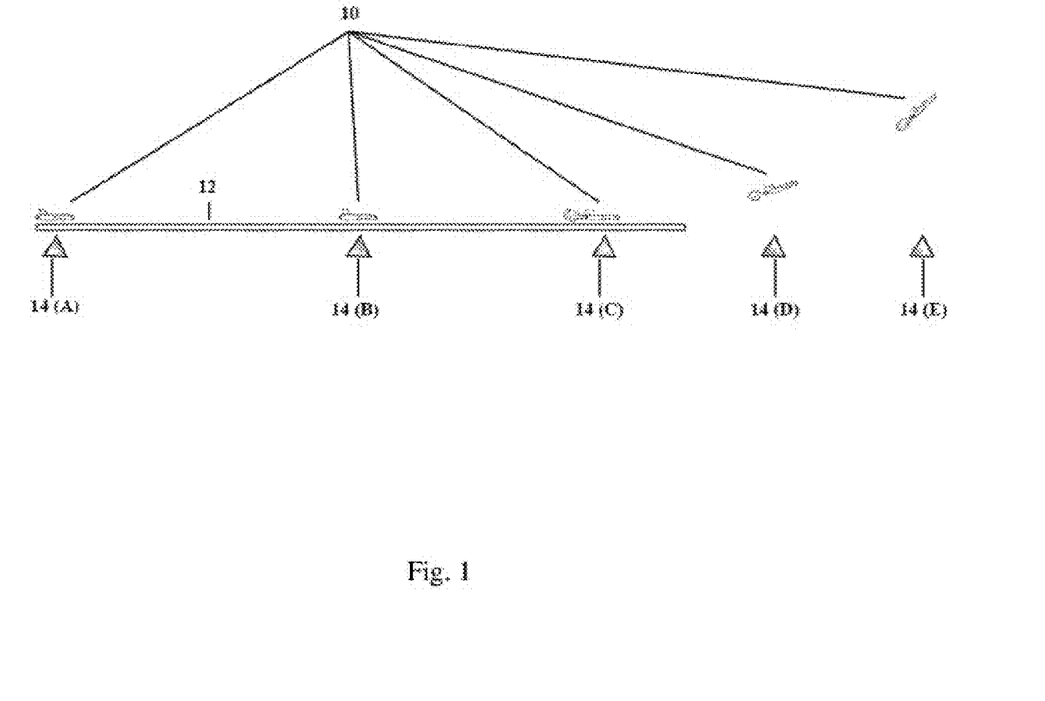
FIG. 1 is a side view of the total system in practice, with marked stages of operation.

Referring now to the invention in more detail, in FIG. 1, there is shown side view time lapse visualization of the Space Plane Launch Vehicle 10, on a Magnetic Levitation Linear Induction Rail System 12, displaying five phases of launch 14 (A-E). Stage A is from stand-still to supersonic speeds. Stage B is from supersonic to hyper sonic speeds. Stage C is post hypersonic and beginning of additional power provided by a steam rocket engine. Stage D is decoupling from launch sled and free flight course correction burn to escape vector. Stage E is full power burn to escape velocity and orbital insertion. A variety of attitude and vector changes may occur on any of these stages to maximize efficiency.

Figure 2:
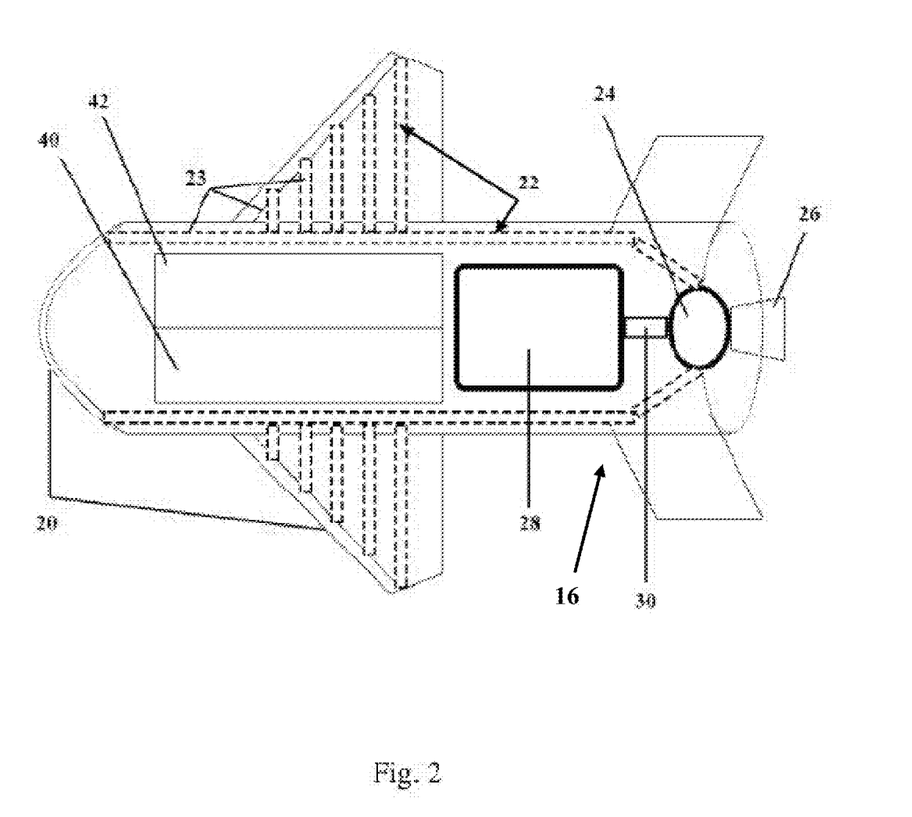
FIG. 2 is a top-down perspective view of the Space Plane Launch Vehicle.
Figure 3:
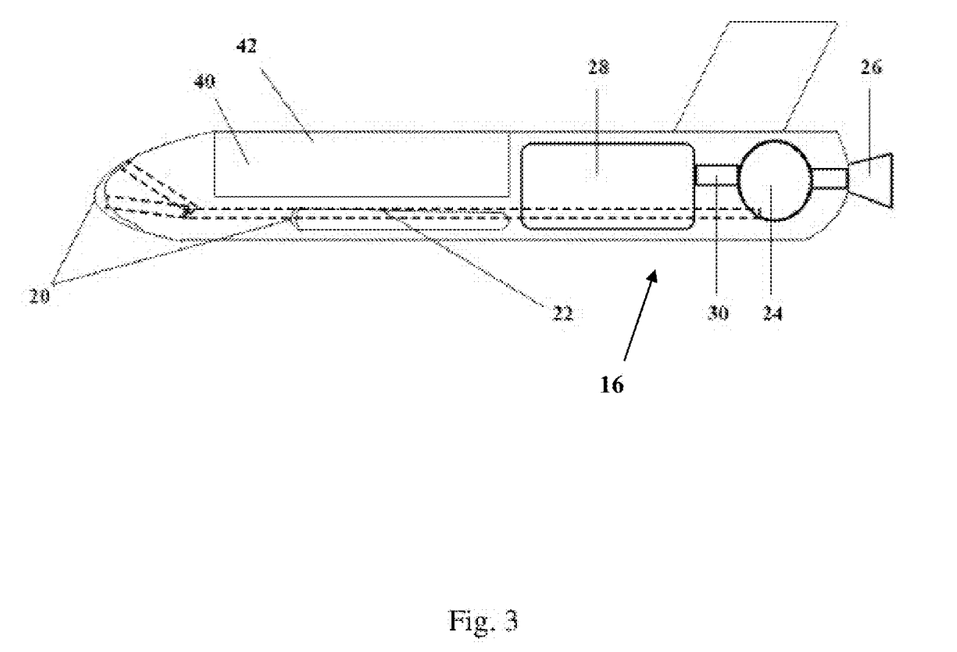
FIG. 3 is a side view of FIG. 2.
Figure 4:
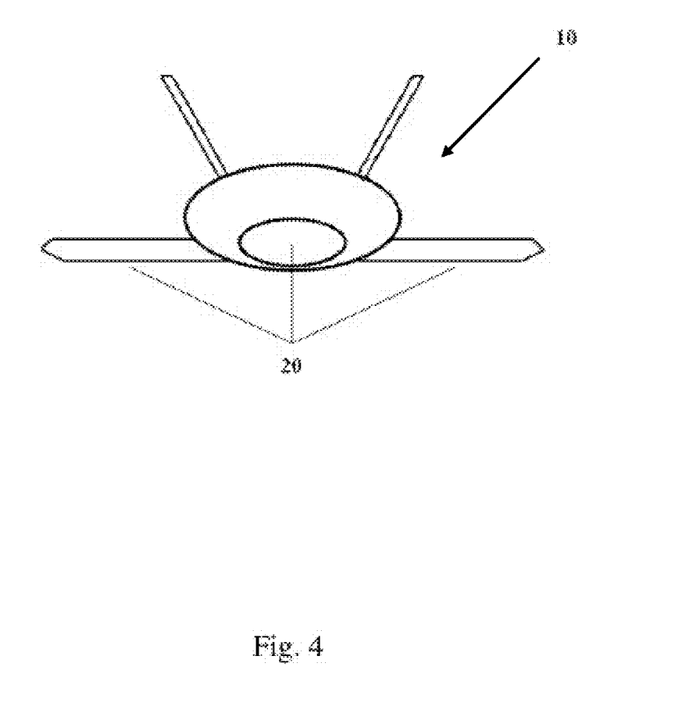
FIG. 4 is a front view of FIG. 2.

In FIG. 2, FIG. 3, and FIG. 4 there is shown the Space Plane Launch Vehicle from a Top View, Side View, and Front View respectively. Contained within the Space Plane Launch Vehicle are Leading Edge Thermal Shield Airfoils 20 on the leading edges of both wings and the nose region, a Thermal Heat Transport system 22, which connects the Thermal Shield Airfoils 20 to the Boiler Chamber 24, which provides the extra energy to the super-critical water sourced from the Super-critical Water Storage 28 by the Water Flow Controller 30 to produce super-critical steam within the Boiler Chamber 24, and the super-critical steam that is generated is directed from the Boiler Chamber 24 out an exhaust nozzle via the Steam Exhaust Thrust Control System 26 (or Super-critical Steam Exhaust Thrust Control System 26). The Steam Rocket Engine 16 includes the Super-critical Water Storage 28, the Water Flow Controller 30, the Boiler Chamber 24, and the Steam Exhaust Thrust Control System 26. Once orbital altitude is reached, the Cargo Bay Doors 42 open, exposing the Cargo Bay 40 for cargo removal.

Figure 5:
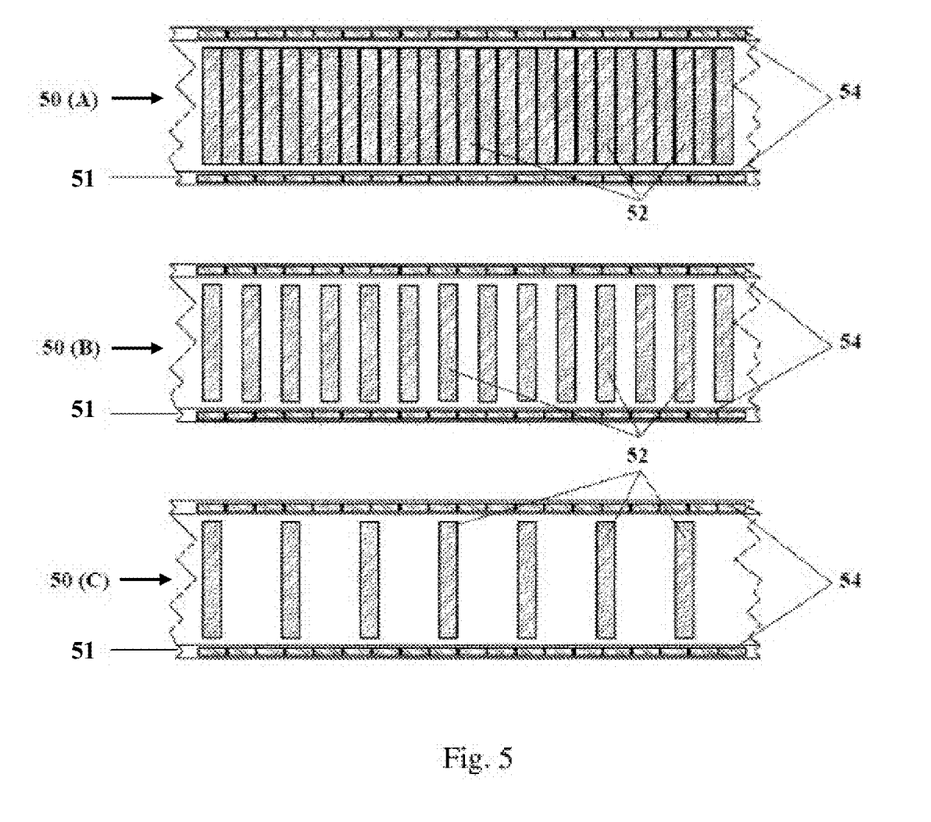
FIG. 5 is a top view of different stages of magnetic levitation linear accelerator rail.

In FIG. 5 there is shown three different stages of the Magnetic Levitation Linear Induction Rail System 50 (A-C) (also shown as the Magnetic Levitation Linear Induction Rail System 12 in FIG. 1), showing the Magnetic Levitation Rail Bed 51 and ever greater spacing of the Magnetic Levitation Electromagnets 52, while consistent spacing for the Sled Stabilizer Electromagnets 54 is demonstrated across the three stages (A-C).

Figure 6:
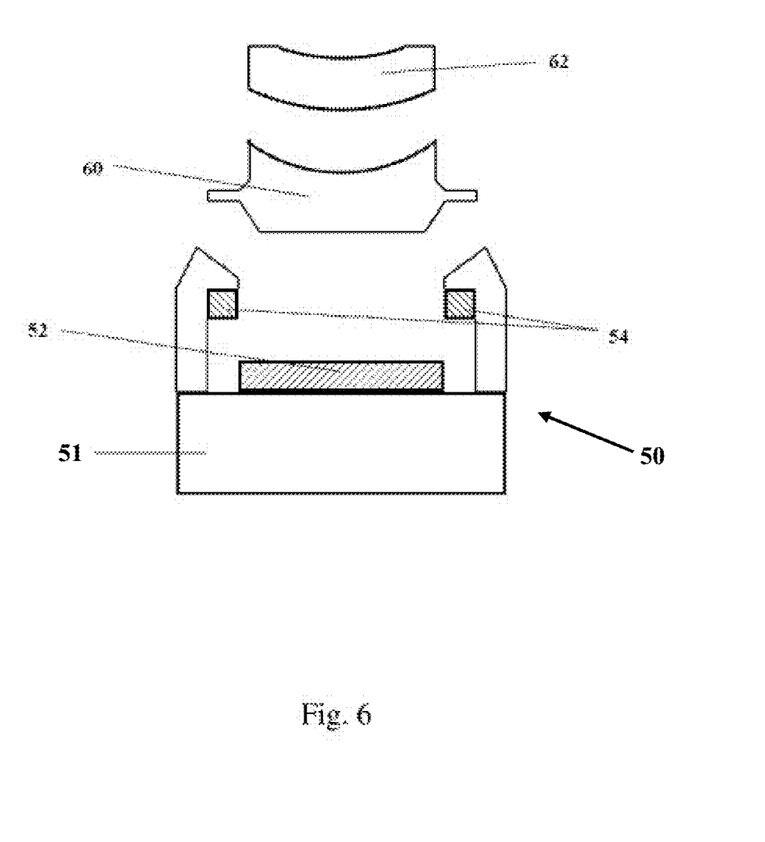
FIG. 6 is a front view of magnetic levitation linear accelerator rail with space plane launch vehicle sled and cradle.

In FIG. 6 there is a front view cut away of the Magnetic Levitation Linear Induction Rail System 50, and the Space Plane Launch Vehicle Accelerator Sled 60 with the Space Plane Launch Vehicle Sled Cradle 62 shown for reference.

Figure 7:
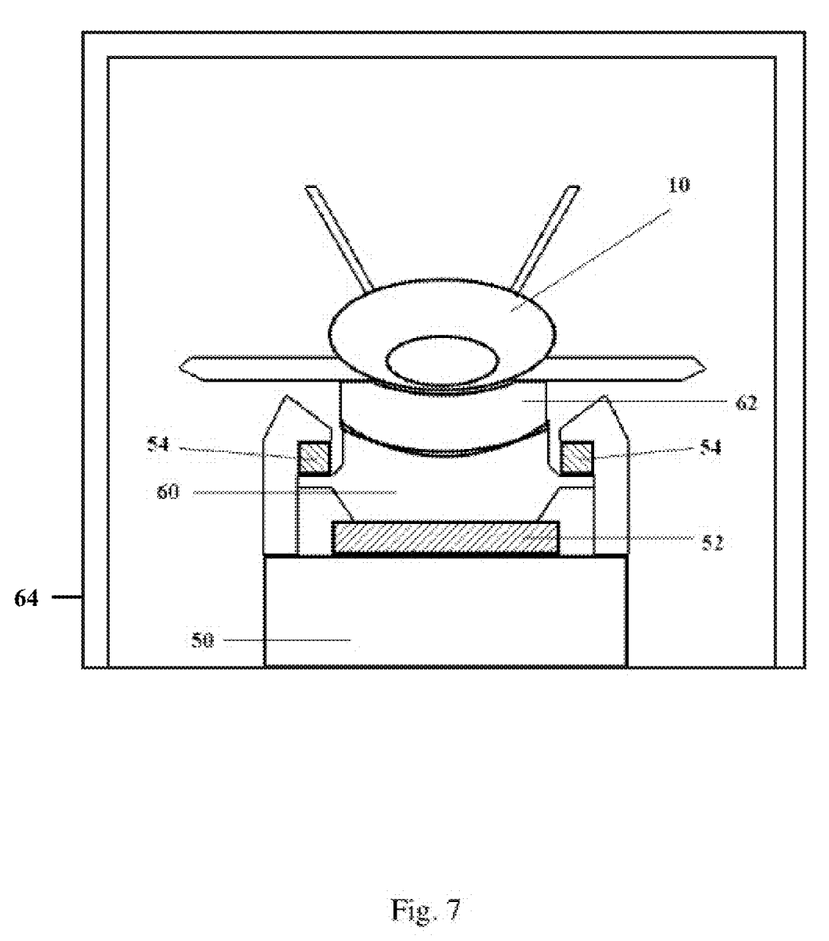
FIG. 7 is a front view of the magnetic levitation linear accelerator sled mounted with cradle and space plane launch vehicle on the magnetic levitation linear accelerator rail.

In FIG. 7 there is displayed a similar front view of the Magnetic Levitation Linear Induction Rail System 50 as is displayed in FIG. 6, but with the addition of the Space Plane Launch Vehicle 10, and the Space Plane Launch Vehicle Accelerator Sled 60 and Space Plane Launch Vehicle Sled Cradle 62 assembled together and placed on the rail system. The Magnetic Levitation Linear Induction Rail System 50, Space Plane Launch Vehicle 10, Space Plant Launch Vehicle Accelerator Sled 60, and Space Plane Launch Vehicle Sled Cradle 62 are shown within a Rail Enclosure 64.

Figure 8:
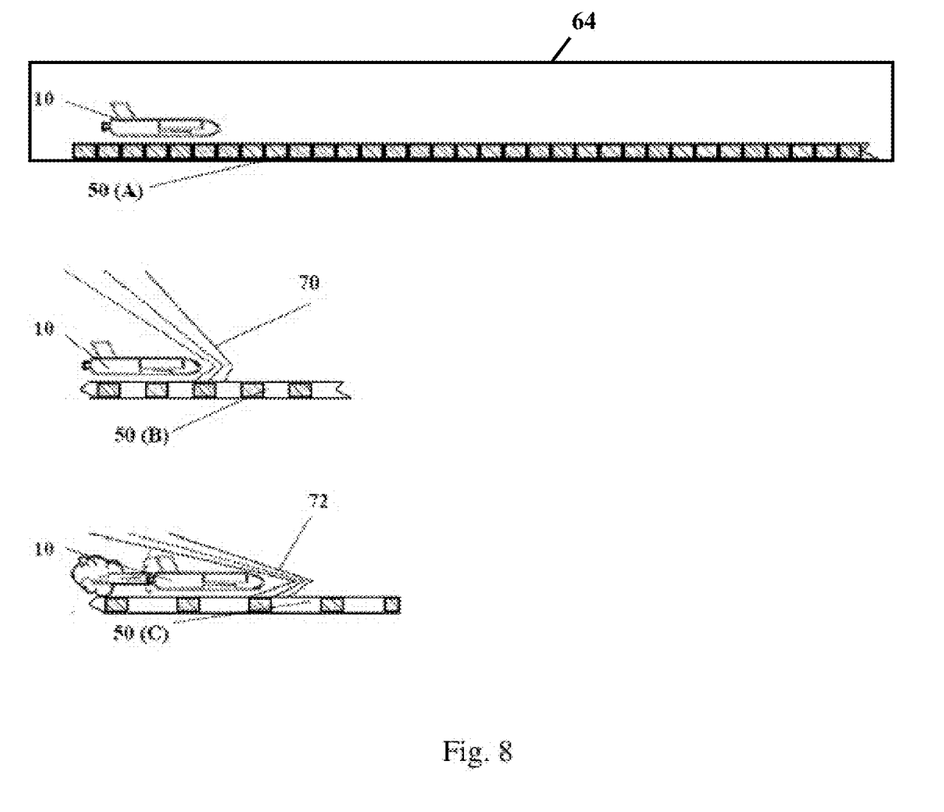
FIG. 8 is a side detail view of the three stages of thermal energy scavenging.

In FIG. 8 there is shown the three main stages of the method for thermal energy scavenging utilizing the Space Plane Vehicle 10, on the three stages of Magnetic Levitation Linear Induction Rail System 50 (A-C) with the resultant Supersonic Thermal Shockwave 70 for stage (B) and Hypersonic Thermal Shockwave 72 for stage (C).

The basis of the invention rest upon several natural principles: A) Magnetic Levitation, B) Magnetic Linear Accelerators (a method of accelerating mass with electrical power), C) supersonic and hypersonic atmospheric thermal shockwaves, D) unique properties of supersonic and hypersonic airfoils, E) the fundamental principles of Thermal Conduction, Induction, and Radiation, F) unusual properties of high temperature conductive alloys, G) Boyle's Law and Charles's Law relating to gasses, and H) traditional Rocket Science.

Magnetic Levitation is a technique where an object is supported entirely by magnetic fields, usually generated by electromagnets. The repulsion of magnetic forces, following Lenz's Law, provide for contactless and stable positioning. This invention utilizes Magnetic Levitation for Space Plane Launch Vehicle Accelerator Sled positioning on the Magnetic Levitation Linear Induction Rail System.

Magnetic linear accelerators have been in use since the invention of electromagnets, and convert magnetic energy into kinetic energy by relying on the strength of opposing magnetic fields to cause a magnetic chain reaction to launch an object at high speed. The Magnetic Levitation Linear Induction Rail System functions similar to a magnetic linear accelerator, with each successive Magnetic Levitation Electromagnet also providing a pulling acceleration growing ever greater in strength as the Space Plane Launch Vehicle Accelerator Sled approaches, and turns off to collapse its magnetic field just as the sled passes over. As the sled travels faster and faster, the timing and power of the electromagnets will need to be adjusted, as conversion of electromagnetic energy into kinetic energy takes time. As the sled moves faster, it will have less time exposed to each individual electromagnet, so to provide for even acceleration and optimal power use, electromagnets will be spaced further and further apart, while growing stronger in field strength. The three primary stages of linear acceleration are (A) from full stop to supersonic speeds, (B) from supersonic to hypersonic speeds, and (C) faster than hypersonic. While at full stop, gravity will be pulling the sled assembly down to the tracks and magnetic repulsion will be keeping the sled assembly from touching, but as the craft goes faster and faster, the airfoil will begin to exhibit lift and will attempt to increase altitude. The stabilizer electromagnets will keep the sled pushed down against the repulse fields of the magnetic levitation drivers at first, and then will keep the sled from flying off because of the lift forces on the Space Plane Launch Vehicle. At hypersonic speeds, and when the electromagnet drivers are becoming spaced further and further apart, the steam rocket engine will kick in, keeping thrust constant or accelerating.

From the dawn of supersonic flight, engineers have had to contend with shockwaves formed from excessive air compression at the leading edges of airfoils. Moving up to hypersonic speeds, the shockwaves produce very high temperatures corresponding to the level of compression of the atmosphere, which at very high speeds of thousands of miles per hour, can reach temperatures in the thousands of degrees centigrade. Thermal failure of critical components was common in early test flights and is still of paramount concern. This invention is novel in that it uses this thermal energy to power acceleration, where all prior spacecraft and aircraft others simply try to mitigate it.

As part of the efforts to mitigate supersonic and hypersonic shockwaves, a wide variety of airfoils have been developed that exhibit useful properties like the ability to keep harmful shockwaves projected at some distance away from the physical airframes of the craft, and as an example, it was a feature of the Space Shuttle's airfoil that kept super-heated air plasma projected away from the surface of the shuttle, and it was a failure of the airfoil, due to physical surface changes on the Space Shuttle that occurred from missing ceramic tiles that had become dislodged during launch, that caused the Space Shuttle Columbia to experience catastrophic thermal failure. The ability to modify exactly where the thermal shockwave will occur is critical to this invention, as the thermal shockwave will be focused near to thermal shielding of the Space Plane Vehicle mounted on the leading edges of the wings and nose, at some pre-determined distance from the physical airframe of the Space Plane Vehicle.

Accordingly, by the fundamental principles of Thermal Conduction, Induction, and Radiation, thermal energy concentrated on the thermal shielding/heat sinks on the leading edges of the wing and nose of the Space Plane Launch Vehicle, can be transported via a network of heat pumps and thermal transport systems, which are all connected to the boiler chamber, keeping the boiler chamber at over 1,000 degrees centigrade, even as it is converting liquid water steam fuel into super-critical steam exhaust. The entire thermal transport system, and boiler will be pre-heated to operating temperature via magnetic or electric induction immediately prior to launch, and will only have less than a minute or two to cool down before being refreshed with thermal energy from the hypersonic shockwave. As long as velocity is maintained, or increased as atmospheric density decreases, the hypersonic shockwave will transmit mega joules in energy to the boiler chamber.

A super-critical fluid is a fluid that is at pressures higher than its thermodynamic critical values. At pressures above the critical pressure, the properties of water will gradually change from liquid-like properties to gas-like properties, but without a phase change. Thus, super-critical water has properties of both a liquid and a gas, although it is considered a single-phase fluid. Herein, for simplicity, super-critical water having more liquid-like properties (e.g., high density and small compressibility) within the boiler chamber is referred to as "super-critical water," whereas super-critical water having more gas-like properties (for example, low density and large compressibility) that is exhausted from the steam exhaust thrust control system (and that explosively expands as it is exhausted) is referred to as "super-critical steam." By adding super-critical water to the boiler chamber, the principles of Boyle's Law and Charles's Law relating to gasses come into play, in that the heat energy will cause the liquid super-critical water to convert to a super-critical steam, and would easily cause the entire craft to explode with great force if it were not for a controlled exhaust system combined with an actuated nozzle allowing control of thrust. By adding only an appropriate amount of super-critical water at an appropriate time to produce super-critical steam, the super-critical steam exhaust pressure can be maintained at a consistent level providing consistent thrust.

The calculations for mass flow rate over time are the foundations of rocket science, and at this stage, the invention performs like a simple rocket producing thrust which translates into a specific impulse. Using the aerodynamic control surfaces of the Space Plane Launch Vehicle allow it to attain an escape vector, and the actuated rocket nozzle allows for adjustments once there is insufficient atmospheric pressure which will leave the aerodynamic control surfaces useless, along with an array of maneuvering thrusters mounted on the Space Plane Launch Vehicle.

The advantages of the present invention include, without limitation, that it dramatically reduces the cost and environmental impact for transporting high volumes of durable goods into Earth orbit, while greatly increasing the total volume of materials that Humanity can put into orbit, enabling the creation of much larger space projects then have heretofore not been possible. Large interplanetary spacecraft, orbital colonies, staging areas for Moon and Mars colonies and more will all require huge volumes of building materials, oxygen, water, food stuffs, and other durable goods, and the primary purpose of this invention is to provide the systems, methods, and devices for making these endeavors possible.

The Space Plane Launch Vehicle represents a refinement over past space plane inventions like the Space Shuttle and the X-37b, which are both launched vertically from conventional rockets. This invention presents an entirely novel way to achieve escape velocity, starting horizontally at sea level, harnessing the very energy that other craft need to mitigate. By using only electricity to both pre-heat the thermal systems of the Space Plane Launch Vehicle, and for launching it via the Magnetic Levitation Linear Accelerator Rail, the environmental impact of the Megawatt power generation facility is tied directly to how the power is generated. Nuclear power will generate no carbon footprint, but has the associated radiation issues. Solar power will also generate no carbon footprint, but the environmental impact of a solar power farm would need to be considered. By using only liquid water steam as fuel mass, the exhaust will be super-critical steam, which will convert almost instantly into water vapor. The entire system will be essentially be a cloud generator and could possibly change the albedo of the area where it is constructed and could also change the local weather patterns if used at full potential, bringing higher humidity, more cloud cover, and rain.

While the invention will most likely not be suitable for delicate cargo, like instruments, electronics, and biologics/crew, it is very suitable for items like space construction tubing, space construction plating, radiation shielding, fuel, batteries, storage tanks, pipes and fittings, oxygen, water, foodstuffs, heavy tools, and a myriad of other durable goods that would be required in orbit if Mankind is to make a serious attempt to move into Space.

The invention would come at great financial cost, as it would require dozens of linear miles of dedicated land for the launch facility, which would also serve as a landing facility as it would need to be built by a large body of water. It would require the construction of a multi-hundred megawatts power generation facility and the construction of the most powerful, level, and precise magnetic levitation linear accelerator ever created. The Space Plane Launch Vehicle would be expensive to engineer, but the per-unit cost would be very reasonable, with the most significant cost being the metal alloys that made up the thermal shield/heat sinks, thermal transport system, and boiler, and the exotic materials used to make the majority of the hull. Once constructed, however, it would be, by far, the cheapest way, per ton, to launch durable goods into orbit and would have the smallest possible environmental impact, certainly much smaller than common methods used today.

The invention claimed is:

1. A system for horizontal, sea level launching of space vehicles, the system comprising:
    a horizontal magnetic levitation linear induction rail system;
    a space plane vehicle accelerator sled, the space plane vehicle accelerator sled being configured to be magnetically levitated and accelerated by the horizontal magnetic levitation linear induction rail system; and
    a reusable space plane vehicle, the reusable space plane vehicle being configured to be mounted to the space plane vehicle accelerator sled, the reusable space plane vehicle including:
        a plurality of leading-edge thermal shields;
        a thermal heat transport system configured to move thermal energy; and
        a plurality of thermal transfer conduits; and
        a super-critical steam rocket engine, the super-critical steam rocket engine including a super-critical water storage configured to hold an amount of super-critical water, a water flow controller, a boiler chamber, and a steam exhaust thrust control system.

2. A method for launching a cargo into Low Earth Orbit, the method comprising:
    coupling a space plane vehicle to a space plane vehicle accelerator sled, the space plane vehicle including a thermal heat transport system and a steam rocket engine, the thermal heat transport system including at least one leading edge thermal shield airfoil on a portion of the space plane vehicle, the steam rocket engine having a super-critical water storage, a water flow controller, a boiler chamber, and a steam exhaust thrust control system;
    magnetically levitating the space plane vehicle accelerator sled with a horizontal magnetic levitation linear induction rail system, the horizontal magnetic levitation linear induction rail system including a plurality of electromagnets;
    with the plurality of electromagnets, linearly accelerating the space plane vehicle accelerator sled to hypersonic speed;
    with the thermal heat transport system, transferring thermal energy from the at least one leading edge thermal shield airfoil to the boiler chamber;
    with the thermal energy from the at least one leading edge thermal shield airfoil, adding additional heat to a volume of super-critical water within the boiler chamber to produce super-critical steam; and
    with the steam exhaust thrust control system, exhausting the super-critical steam to produce thrust to propel the space plane vehicle.

3. The system of claim 1, wherein the reusable space plane vehicle further includes:
    a nose region; and
    a plurality of wings; and
    a plurality of fins; and
    at least one of the plurality of leading-edge thermal shields being on the nose region, at least one of the plurality of leading-edge thermal shields being on at least one of the plurality of wings, and at least one of the plurality of leading-edge thermal shields being on at least one of the plurality of fins, and the thermal heat transport system being in thermal communication between the plurality of leading-edge thermal shields and the boiler chamber, by means of the plurality of thermal transfer conduits.

4. The system of claim 1, further comprising:
a rail enclosure, the rail enclosure being configured to produce a gradient of lower pressure, the horizontal magnetic levitation linear induction rail system being located within the rail enclosure.

5. The system of claim 1, further comprising a space plane vehicle sled cradle, the space plane vehicle sled cradle being positionable between the space plane vehicle accelerator sled and the reusable space plane vehicle; and
the space plane vehicle sled cradle being hollow and configured to contain an amount of liquid water.

6. The system of claim 1, wherein the horizontal magnetic levitation linear induction rail system includes:
a magnetic levitation rail bed;
a plurality of magnetic levitation electromagnets; and
a plurality of sled stabilizer electromagnets, the plurality of magnetic levitation electromagnets extending between at least two of the plurality of sled stabilizer electromagnets, the plurality of sled stabilizer electromagnets acting to prevent the space plane vehicle accelerator sled from departing from the horizontal magnetic levitation linear induction rail system as velocity and aerodynamic lift increases.

7. The system of claim 6, wherein:
each of the plurality of magnetic levitation electromagnets is configured to be independently operated to selectively produce or collapse a magnetic field; and
the horizontal magnetic levitation linear induction rail system includes a first end and a second end opposite the first end, a spacing between adjacent electromagnets of the plurality of magnetic levitation electromagnets increases from the first end to the second end of the horizontal magnetic levitation linear induction rail system, and an electromagnetic field strength of each of the electromagnets of the plurality of magnetic levitation electromagnets increases from the first end to the second end of the horizontal magnetic levitation linear induction rail system, such that a magnetic levitation electromagnet proximate the second end of the horizontal magnetic levitation linear induction rail system has a greater field strength and a greater spacing from an adjacent electromagnet of the plurality of magnetic levitation electromagnets than an electromagnet of the plurality of magnetic levitation electromagnets that is proximate the first end of the horizontal magnetic levitation linear induction rail system.

* * * * *